Dec. 30, 1941. J. MORKOSKI Re. 21,989

TRACTOR IMPLEMENT

Original Filed July 25, 1936

Inventor
James Morkoski
By V. J. Lusagne
Atty.

Reissued Dec. 30, 1941

Re. 21,989

UNITED STATES PATENT OFFICE 21,989

TRACTOR IMPLEMENT

James Morkoski, Canton, Ill., assignor to International Harvester Company, a corporation of New Jersey Original No. 2,109,677, dated March 1, 1938, Serial No. 92,491, July 25, 1936. Application for reissue July 21, 1941, Serial No. 403,419

17 Claims. (Cl. 97—50)

This invention relates to means for lifting and lowering tractor attached implements, and more particularly to means for guiding and controlling the movements of the implements during the lifting and lowering operations.

The main object of the invention is to provide improved means for laterally shifting direct connected tractor attached implements as they are raised and lowered.

A more specific object of the invention is to provide means for shifting the plow beams of one-way and two-way direct connected plows, located underneath the tractor axle, to one side upon the raising of the plow beams to transport position and for allowing the return of the plow beams to correct plowing position underneath the tractor axle upon lowering the beams.

Another object is to provide free movement of the plow beam or beams laterally of the tractor when in lowered or operating position and for holding them against movement when in raised position.

Another object is to provide means for leveling of the plow bottom.

Another object of the invention is to incorporate the means for shifting the plow beam laterally in the mechanism for raising and lowering the plow.

Other minor objects and advantages will become apparent to those skilled in the art from the detailed description of the preferred embodiment of the invention to follow.

Figure 1:
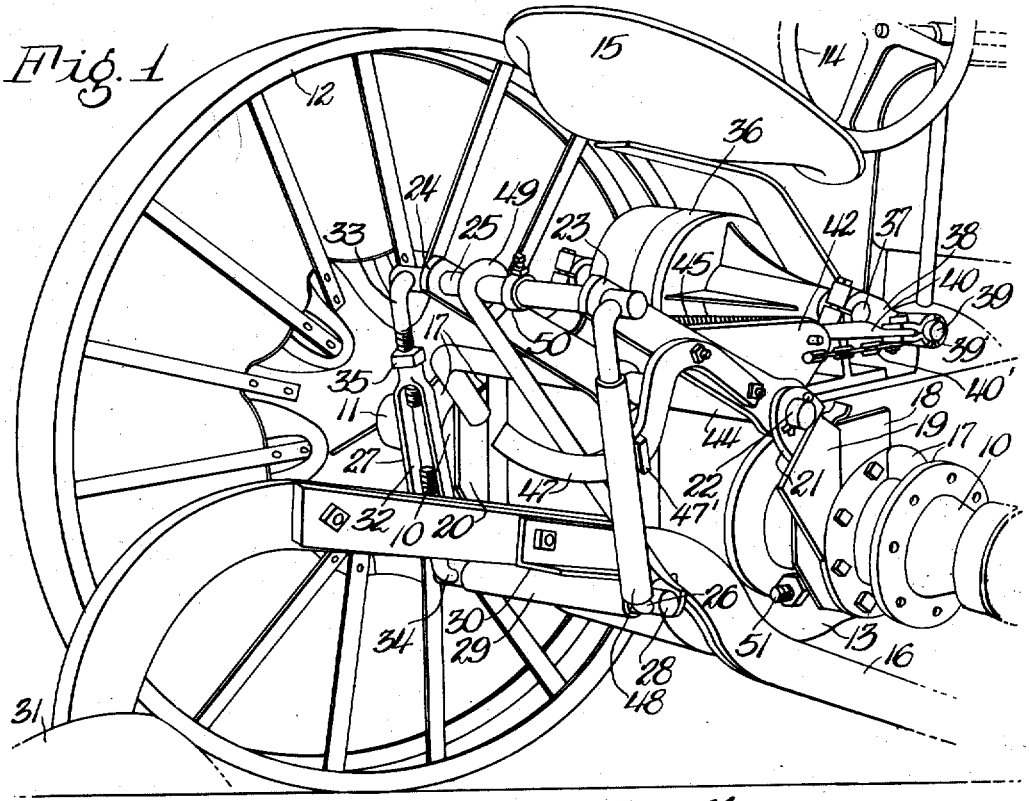
Figure 2:
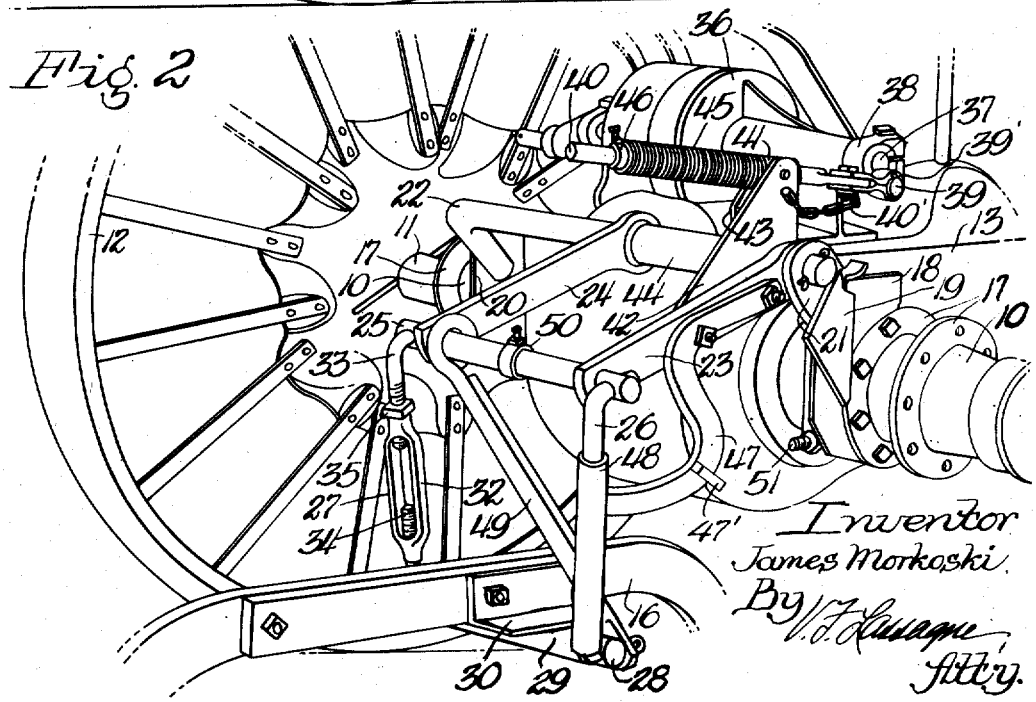

The invention accordingly resides in the combination and details of the construction hereinafter described and claimed, and illustrated in the following drawing, wherein:

Figure 1 is a perspective view of the rear end of a tractor with a one-way plow attached, showing the specific construction for shifting the plow beam laterally; and Figure 2 is a view similar to Figure 1, showing the plow beam in lowered or ground working position.

The invention is illustrated in combination with a tractor of the type having a wide type rear axle structure with the rear wheels adjustable thereon. The tractor and power lift attachment are similar to those disclosed in the patent to Johnston No. 2,039,801, granted May 5, 1936. The tractor has a rear axle housing 10 from which differentially driven axle shafts 11 project. The shafts 11 have traction wheels 12 adjustably secured thereto in any suitable manner. The tractor has a forwardly extending body portion 13 including side sills which extend to the front end of the tractor, which is supported on dirigible steering wheels. This construction has not been shown, as it is not necessary for the understanding of the invention. The dirigible steering wheels are controlled through a steering wheel 14 located adjacent an operator's seat or station 15. In the present invention, as all that it is necessary to describe is the lifting mechanism and the means for shifting a plow beam 16, only the rear supporting structure for the plow beam 16 will be described. The construction for hitching and supporting the forward end of the plow beam may be of any well known type, such, for instance, as that disclosed in the patent to A. C. Lindgren et al., No. 1,941,013, December 26, 1933.

Supported from flanges 17 are coupling members 18. These coupling members 18 are known as quick attachable and detachable members to which complementary attaching members of the implement are attached. Mounted on the coupling members 18 are complementary supporting members 19 and 20. Extending rearwardly from the supporting member 19 is a supporting bracket 21. Welded, or otherwise secured, to the supporting member 20 is a transversely extending support 22 in the shape of a shaft. The member 22 is loosely mounted in the supporting bracket 21. Journaled on the transverse support 22 are rearwardly extending lifting arms 23 and 24 which with their adjacent actuating parts comprise means for raising and lowering the implement gang or plow beam 16. At the rear of the lifting arms 23 and 24 is mounted a transverse shaft 25, which is free to pivot in the lifting arms 23 and 24. Connecting the plow beam 16 with the lifting arms 23 and 24 are depending lifting links 26 and 27 The lifting links 26 and 27 are pivotally attached to a transverse member 28. The transverse member 28 is journaled in a member 29 which is welded or otherwise secured to brackets 30, which are secured on either side of the plow beam 16. As the lifting links 26 and 27 are pivotally attached at their upper ends, to the transverse member 25 and also pivotally attached to the transverse member 28 at their lower ends, it is obvious that the plow beam 16 may have a free lateral swinging movement which is necessary in case the plow hits an obstruction, and also is necessary to secure the best results in plowing. In addition, as the members 25 and 28 are so mounted as to be journaled in the members 23, 24, and 29, it is evident that the plow beam, besides having a free lateral swinging movement, will also have a longitudinal movement. To adjust or level the plow bottom 31 in ground engaging position, the lifting link 27 has an adjustment to tilt the plow beam. The adjustment is in the form of a turnbuckle adjustment wherein the link 27 may be shortened or lengthened at the will of the operator. The turn-buckle adjustment comprises a turn-buckle 32 with its ends threaded in opposite directions and connected to threaded members 33 and 34. When the correct adjustment of the plow beam has been made, the adjusted position is secured by a lock nut 35. It is, therefore, obvious that with this simple turnbuckle adjustment, the plow beam may be readily adjusted.

The plow beam is raised and lowered by the hydraulic lifting mechanism 36 which is the same as that disclosed in the patent first cited. The hydraulic lifting mechanism is actuated from a pump driven from the tractor engine and may be operated when the tractor is standing still. The hydraulic lifting mechanism 36 has a transversely extending lifting shaft 37, which is oscillated to move the implement from ground engaging to transport position upon the operation of a control valve within reach of the operator's station 15. The transverse shaft 37 extends laterally to each side of the tractor frame. Therefore, it is obvious that the mechanism may also be used to raise and lower a two-way plow, although only a one-way plow will be described, as it is obvious that, as each plow lifting mechanism is the same, it is only necessary that the construction of one of the plow beams and its lifting mechanism be understood. Attached to the transverse rockshaft 37 is a crank arm 38 having a laterally extending crank pin 39. Rearwardly extending from the crank pin 39 is a pressure rod 40. The pressure rod 40 is connected at its forward end to the crank arm 38 by a member 39' journaled on the crank pin 39. At its rear end the pressure rod 40 is slidably mounted in a lost motion connection 41. The lost motion connection 41 is pivotally mounted on supporting members 42 and 43. The supporting member 42 is welded or otherwise secured to the lifting arm 23. The member 43 is welded or otherwise secured to a pipe-shaped member 44 journaled on the transverse support 22. The member 44 is welded or otherwise secured to the lifting arms 23 and 24. In order to apply pressure upon the ground working tool whenever the soil conditions are such that pressure is needed to aid in forcing the ground working tool into the ground, a pressure spring 45 is mounted on the pressure rod 40 in order to form pressure means. An adjusting collar 46, mounted on the pressure rod 40, can be used to adjust the spring pressure. The pressure spring 45 is a tension spring and it is obvious that, when the beam 16 is in its ground working position, the tension of the spring 45 is so adjusted that pressure is exerted on the spring 16 through the various connections to force the ground working tool into the ground. With this pressure attachment it is necessary that a lifting link 40' be provided to raise and lower the implement attachment. The lifting link 40' in this instance is in the form of a flexible chain, which in effect provides a lost motion means wherein the implement beam may be raised and lowered and pressure applied in ground engaging position, and connects the member 39' with the oscillatory member 42. It is obvious that the flexible link 40' may take any other form of a lost motion connection. As the lifting arms 23 and 24 are welded or otherwise secured to the transverse member 44, it is obvious that, upon the operation of the hydraulic lifting mechanism, the lifting arms 23 and 24 will be oscillated in a to and fro movement about the transverse member 22 to raise or lower the plow beam. The member 42 with its attaching parts forms a movable or oscillatory means for raising and lowering the implement gang or beam 16 with its attached parts.

As it is necessary in plowing to have the plow beams mounted as low as possible underneath the frame of the tractor and as near to the center line of the tractor as possible to obtain the correct draft connection, it is necessary to provide some means upon the raising of the plow beam to cause the plow beam to swing laterally from underneath the transmission housing of the tractor. In this invention, it is accomplished by providing a cam-shaped member 47 secured to the lifting arm 23. The cam-shaped member 47 has a downwardly extending portion and is bent inwardly and rearwardly to provide a cam engaging surface. The rear portion of the member 47 engages a roller 48 mounted on the lifting link 26 and this structure may be considered as the means mounted on said raising and lowering means for laterally shifting said implement gang. The roller 48 is provided to reduce the friction between the member 47 and the link 26. It is, therefore, obvious that, as the lifting mechanism is operated, and, as the lifting arm 23 is raised, the link 26 tends to remain in a vertical position because of its pivot connections and, that, as the lifting arm 23 is raised, the distance between the arm 23 and the link 26 is shortened at the lower end of the link 26. As the plow beam is raised, therefore, the cam surface of the member 47 engages the roller 48, causing the plow beam to move laterally to the right and from underneath the housing 13 of the tractor. When the plow beam is raised to transport position, the position of the link 26, the cam-shaped member 47, and the lifting arm 23 is as shown in Figure 1 engaging the bumper means 47' on the cam-shaped member or means 47 for forcing the implement beam rearwardly. The lateral movement of the plow beam is limited by the engagement of a diagonal member 49 with an adjusting collar 50, which is mounted on the transverse member 25. The adjusting collar may be adjusted transversely on the member 25. By means of this diagonal brace member, which is loosely mounted on the member 25 at its upper end and pivotally mounted on the forward extension of the lifting link 26, the lateral movement of the plow beam may be adjusted or limited by the position of the adjusting collar 50. By placing the adjusting collar 50, it is obvious that the lateral movement of the plow beam 16 is governed by the lateral distance between the adjusting collar 50 and the lifting arm 24. When the plow beam is in lowered or ground engaging position, as shown in Figure 2, the diagonal brace member 49 abuts the lifting arm 24. In raised or transport position the diagonal brace member 49 takes the position shown in Figure 1.

It is, therefore, evident that a simple mechanism has been provided to shift the plow beam laterally from underneath the transmission housing of a tractor during the lifting operation. It is also evident that, when this mechanism is used for a two-way plow attachment, the members 47 and 49 of the shifting mechanism are of opposite hands to that described. The plow attachment may be readily attached or detached from the tractor by detaching the bolts 51, which secure the supporting brackets 19 and 20 to the coupling members 18. After these brackets have been detached, all that it is necessary to do is to remove the front connection 39' of the pressure rod 40 from the crank pin 39, and, after disconnecting the forward connections of the plow to the tractor, drive the tractor away. The plow attachment is connected by attaching the various members in reverse order, as previously described for detaching.

It is, therefore, obvious that a simple hydraulic lift mechanism for both a one-way and a two-way plow has been described, as well as mechanism for the lateral shifting of the plow beam from underneath the tractor housing from ground engaging to transport position. In addition, a plow construction has been described in which the plow beam is flexibly connected to the tractor in such a manner that it provides a freely floating plow attachment.

The specific construction herein described and illustrated is obviously capable of certain modifications without departure from the scope of the invention as defined in the following claims.

What is claimed is:

1. An agricultural implement comprising a wheeled frame, an implement gang mounted thereon for free lateral movement relative to said frame when in its working position, means for raising and lowering said implement gang, means mounted on the raising and lowering means and incident to the movement of the same for laterally shifting the implement gang during its raising movement.

2. An agricultural implement comprising a wheeled frame, an implement gang mounted thereon for free lateral movement relative to said frame, means for raising and lowering said implement gang, and means mounted on said raising and lowering means for retaining the implement gang in a laterally spaced position when raised.

3. An agricultural implement comprising a wheeled frame, an implement gang mounted thereon for free vertical and lateral movement relat've to the frame when in its working position, means for raising and lowering said implement gang, means mounted on the raising and lowering means and incident to the movement of the same for laterally shifting the implement gang during its raising movement and for retaining the implement gang in its laterally spaced position when raised.

4. An agricultural implement comprising a wheeled frame, an implement gang mounted thereon for free swinging movement relative to said frame, means adapted for to and fro movement mounted on said frame for raising and lowering said implement gang, a depending link mounted on said means and connected to said implement gang, and means mounted on said first-mentioned means and adapted to engage said depending link for shifting said implement gang laterally upon the raising and lowering of said implement gang.

5. An agricultural implement comprising a wheeled frame, an implement gang mounted thereon for free swinging movement relative to said frame, means adapted for to and fro movement mounted on said frame for raising and lowering said implement gang, a depending link mounted on said means and connected to said implement gang, and means mounted on said first-mentioned means for retaining said implement gang in a laterally spaced position upon the raising of said implement gang.

6. An agricultural implement comprising a wheeled frame, an implement gang mounted thereon for free swinging movement relative to said frame, oscillatory means mounted on said frame for raising and lowering said implement gang, a depending link mounted on said oscillatory means and connected to said implement gang, and means mounted on said oscillatory means and adapted to engage said depending link for shifting said implement gang laterally upon the raising and lowering of said implement gang.

7. An agricultural implement comprising a wheeled frame, an implement gang mounted thereon for free swinging movement relative to said frame, means adapted for to and fro movement mounted on said frame for raising and lowering said implement gang, a plurality of depending links mounted on said means and connected to said implement gang, and means mounted on said first-mentioned means and adapted to engage one of said depending links for shifting said implement gang laterally upon the raising and lowering of said implement gang.

8. An agricultural implement comprising a wheeled frame, an implement gang mounted thereon for free lateral swinging movement relative to said frame, means adapted for to and fro movement mounted on said frame for raising and lowering said implement gang, a plurality of depending links mounted on said means and connected to said implement gang, and means mounted on said first-mentioned means and adapted to engage one of said depending links for retaining said implement gang in its laterally spaced position upon the raising of said implement gang.

9. An agricultural implement comprising a wheeled frame, an implement gang mounted thereon for free swinging movement relative to said frame, means adapted for to and fro movement mounted on said frame for raising and lowering said implement gang, a depending link mounted on said means and connected to said implement gang, means mounted on said first-mentioned means and adapted to engage said depending link upon the raising of said implement gang for shifting said implement gang laterally, the aforesaid means being so positioned when the implement gang is in ground engaging position that the implement gang may have free swinging movement relative to said frame.

10. An agricultural implement comprising a wheeled frame, an implement gang mounted thereon for free lateral swinging movement relative to said frame, means adapted for to and fro movement mounted on said frame for raising and lowering said implement gang, a plurality of depending links mounted on said means and connected to said implement gang, and means for limiting the lateral swinging movement of said depending links.

11. An agricultural implement comprising a wheeled frame, an implement gang mounted thereon for free lateral swinging movement relative to said frame, means adapted for to and fro movement mounted on said frame for raising and lowering said implement gang, a plurality of depending links mounted on said means and connected to said implement gang, means for limiting the lateral swinging movement of said depending links, and means for adjusting the length of one of said depending links whereby the implement gang may be leveled.

12. An agricultural implement comprising a wheeled frame, an implement gang mounted thereon for free swinging movement relative to said frame, means adapted for to and fro movement mounted on said frame for raising and lowering said implement gang, a transverse member journaled on said means, a plurality of depending links pivotally mounted on said transverse member and pivotally connected to said implement gang whereby said implement gang may have longitudinal and laterally swinging movement relative to said frame, a diagonal member pivoted to one of said depending links and slidably mounted on said transverse member, and stop means on said transverse member whereby the lateral swinging movement of said depending links can be adjusted.

13. An agricultural implement comprising a wheeled frame, an implement gang mounted thereon for free swinging movement relative to said frame, means adapted for to and fro movement mounted on said frame for raising and lowering said implement gang, a transverse member journaled on said means, a plurality of depending links pivotally mounted on said transverse member and pivotally connected to said implement gang whereby said implement gang may have longitudinal and laterally swinging movement relative to said frame, a diagonal member pivoted to one of said depending links, and a lost motion connection at its opposite end whereby the lateral swinging movement of said depending links is restrained.

14. An agricultural implement comprising a wheeled frame, an implement gang mounted thereon for free swinging movement relative to said frame, means adapted for to and fro movement mounted on said frame for raising and lowering said implement gang, means connecting said first-mentioned means to said implement gang, pressure means attached to said first-mentioned means comprising a spring under tension whereby pressure is applied to the implement gang, and a lost motion means connected to said first-mentioned means whereby the implement gang may be raised and lowered and pressure applied to the implement gang at its lowered position by the aforesaid pressure means.

15. An agricultural implement comprising a wheeled frame, an implement gang mounted thereon for free swinging movement relative to said frame, means adapted for to and fro movement mounted on said frame for raising and lowering said implement gang, means connecting said means to said implement gang, means for actuating said first-mentioned means comprising a lifting link, and pressure means comprising a pressure rod connected to said means for actuating said first-mentioned means, and spring means under tension connecting said pressure rod with said first-mentioned means whereby said implement gang is placed under pressure.

16. An agricultural implement comprising a motor propelled wheeled frame, an implement gang mounted thereon for free lateral movement relative to said frame, means for raising and lowering said implement gang, power lift means actuated from said motor for operating said raising and lowering means, and means mounted on said raising and lowering means for laterally shifting said implement gang.

17. An agricultural implement comprising a wheeled frame, an implement gang mounted thereon for lateral and rearward movement relative to said frame, means for raising and lowering said implement gang, cam-shaped means mounted on said raising and lowering means comprising a downwardly, rearwardy and inwardly extending member for laterally shifting said implement gang, and bumper means on said cam means for forcing the implement beam rearwardly.

JAMES MORKOSKI.